Jan. 10, 1933.  J. R. HEMEON  1,894,175

FLEXIBLE COUPLING DISK

Filed Aug. 26, 1931

Inventor:—
James R. Hemeon
by his Attorneys
Howson & Howson

Patented Jan. 10, 1933

1,894,175

UNITED STATES PATENT OFFICE

JAMES RUSSELL HEMEON, OF TRENTON, NEW JERSEY, ASSIGNOR TO THERMOID RUBBER COMPANY, OF TRENTON, NEW JERSEY, A CORPORATION OF NEW JERSEY

FLEXIBLE COUPLING DISK

Application filed August 26, 1931. Serial No. 559,551.

This invention relates to flexible couplings, and more particularly to drive disks for use in such couplings. Drive disks for flexible couplings are in extensive use in various capacities, being particularly employed in the automotive industries in propeller shaft joints and in coupling pump and generator shaft drives. The fabric disk universal joint as used in automotive vehicles for couplings has been subject to very short life due to the fact that driving washers employed between the disks have not retained an adequate grip on the engaged faces of the disks. The washer usually employed between fabric disks of this character has a series of radial peripheral or concentric corrugations or ribs which are designed to embed themselves in the disk when the nut of the bolt about which the washers are disposed and which extends through the driving disks is tightened. When the joint is initially set up the nut is carefully tightened to a predetermined wrench pull. If the nut is pulled too tight, the washer is liable to fracture the outside plates of the disk material and if not pulled tight enough the drive is not transmitted from the washer diameter but from the relatively smaller diameter of the cap screw body. In the latter case, the cap screw quickly plows through the disk and the joint fails. In the case of proper installation, the washer and disk work well for a relatively short period of the initial life of the joint. During this period and immediately following the same the pressure of the washer into the disk gradually diminishes as the disk material, consisting of a fair amount of soft cured rubber, flows. In some cases it has been recommended in practice to tighten up on the joint when a vehicle embodying such joint has been in service for 500 to 1,000 miles. If this is carried out, the life of the disk and joint is increased approximately 70 percent. Unfortunately, service station operators and mechanics often fail to make the necessary adjustment with the result that the joint is soon destroyed. The increase in life of the joint following this pull up is due to the fact that the central portion of the disk or more particularly the unribbed portions thereof come into solid bearing contact with the body of the disk at about the same time that the ribs resulting from corrugations do, so that an extremely solid gripping action between the disk and washer results throughout the area of the washer. This gripping action can be rendered even more efficient if it is possible to take up on the washer in a manner such that the corrugated portions have a slightly greater grip than the main body of the washer. Accordingly, an important object of the present invention is the provision of a structure wherein the disks and washers are so designed for cooperation with one another that the washer is seated upon an initially compressed area having a greater compression factor than the remaining portions of the body of the disk and so designed that the rib portions of the washer have a greater compression engagement with the disk when the washer is fully seated than the body portions thereof.

These and other objects I accomplish by the construction shown in the accompanying drawing wherein, for the purpose of illustration, I have shown a preferred embodiment of my invention and wherein.

Figure 1:
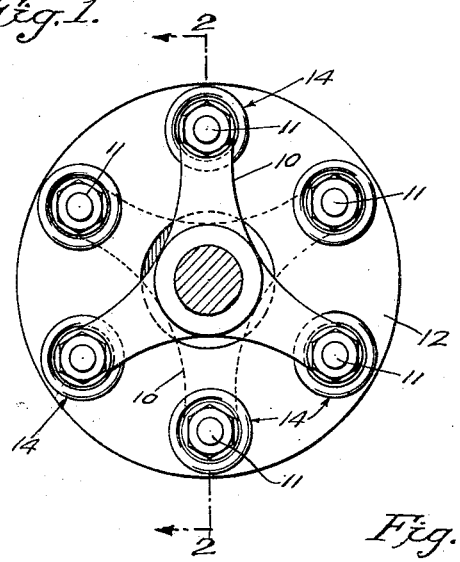
Fig. 1 is an end elevation of a flexible coupling embodying disks constructed in accordance with my invention.
Figure 2:
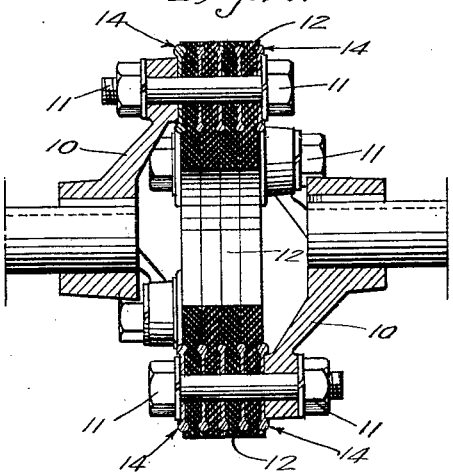
Fig. 2 is a section on line 2—2 of Fig. 1.
Figure 3:
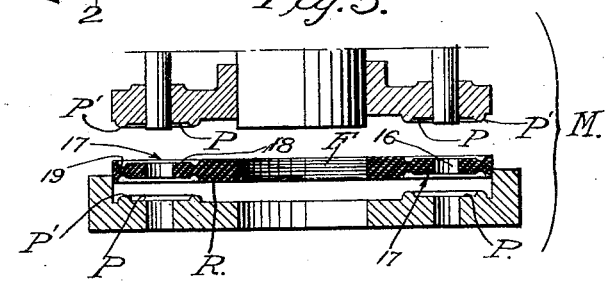
Fig. 3 is a semi-diagrammatic view illustrating one method of molding the disks.
Figure 4:
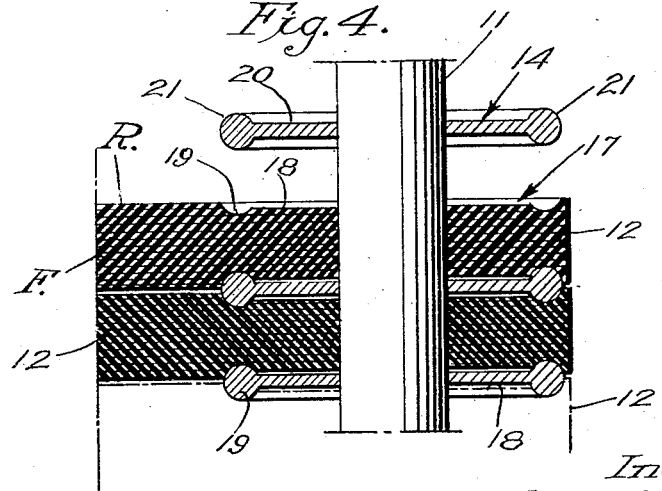
Fig. 4 is an enlarged detail view illustrating the disks prior to compression and showing the relative proportionate depths of the washer sections and the socket areas.

Referring now more particularly to the drawing, the numeral 10 generally designates spiders of a flexible disk coupling the arms of which each mount a cap screw 11 extending through the disks 12 forming the coupling. Between each pair of disks, and preferably between the head of the cap screw and the opposed face of an end disk and the spider arm 13 and the opposed end disk, washers 14 are disposed these washers being at present disclosed as of that type having a peripheral bead or rib 21. In constructing the disks 12 for use in a coupling of this character I preform in the disk about the openings 16 formed for the passage of the screws 11 sockets 17 for the reception of washers 14, a socket 17 being formed in at least one surface of each disk and if so desired at each surface of each disk about each of the openings 16. These sockets are formed by projections P on the upper and lower walls of the mold M with the result that the mold compresses the plies of fabric F and the soft rubber R from which the disk is formed during the curing process, to a greater extent than the remaining portions of the disk. These projections P have ribbed sections P' corresponding to the ribs of the washers 14 and it will be obvious that the portions of the disk aligned with these rib portions will be compressed to a greater extent than those portions of the disk which align with the body portions of the washer. The sockets 17 thus embody areas of minor depth 18 and greater depth 19 adapted to receive respectively the body portion 20 and ribbed portions 21 of the washer. The areas of minor depth are made slightly less than one-half the thickness of the body of the washer while the areas of major depth are made of less proportionate depth with respect to the bead portions 21 so that if a washer is merely loosely placed in this recess the ribbed portions will come to rest upon the bottoms of the areas of greater depth 19 prior to engagement of the body portion 20 of the washer with the surface of the area of minor depth. The differences in depth are preferably made sufficiently slight so that no cutting action will result from the engagement of the beads or ribs with the material at the bottom of the areas of major depth; for example, in a ⅜" disk of the type illustrated the thickness at the bead is approximately 0.145" while the thickness of the body portion is approximately 0.068" so that the bead which projects uniformly to opposite sides of the body portion has a projection of 0.0385". In the prepared recess for reception of such a washer the area of minor depth is countersunk approximately 0.015", while those of major depth are countersunk approximately 0.045". This means that the major depth areas extend below the minor depth areas through 0.03" and that, accordingly, the material must be compressed through 0.0085" in the major depth areas before the body portion of the washer will come into contact with the surface of the minor depth areas.

It will be obvious that with such construction the greatest compression exerted by the washer will be at the ribs or beads thereof but at the same time the compression exerted at these points will be reduced to such an extent that there will be no tendency to cut it particularly since the material in these areas has been cured under a greater pressure than the surrounding material. It also means that a solid grip of the washer throughout its entire area may be obtained without placing sufficient strain upon the washer to cause these ribs to cut into the body of the disk. Due to the fact that those portions of the disk which align with the rib portions of the washers 14 have been subjected to greater compression during the curing process, not only is the rigidity of the clamping action set up by the washer increased, but the likelihood of any cutting of the disk by the rib portion of the washer is reduced.

In the present illustration I have merely shown a preferred type of washer but it will be obvious that the invention herein employed is capable of use with any type of corrugated washer or beaded washer with but the necessary rearranging of the areas of major and minor depth.

Since the construction is capable of a certain range of change and modification without departing from the spirit of my invention, I do not wish to be understood as limiting myself thereto except as hereinafter claimed.

I claim:

1. A disk for flexible couplings comprising a flexible body of compressible material having a bolt hole for the passage of a bolt employed in connecting the disk with the coupling, the disk having in at least one face thereof about said bolt hole a socket for the reception of a washer adapted to surround said bolt and including a body portion and a rib projecting from said body portion, said socket including areas of minor depth for the reception of the body portion of the washer and areas of major depth for the reception of said rib, the areas of major depth exceeding in depth the areas of minor depth by a distance less than the depth of the rib of the washer to be employed therewith those portions of the disk in alignment with the sockets having a compression factor exceeding the compression factor of the body of the disk proportionately to the depth of the aligned portion of the socket.

2. A flexible coupling comprising opposed spiders, a plurality of flexible disks in face to face relation disposed between the spiders and bolts extending from each spider through the disks of the coupling and having disposed thereon between each pair of adjacent disks a washer, the washers comprising a body portion having at at least one face thereof a projecting rib, said disks having formed therein about openings for the passage of said bolts and at at least one face thereof a socket for the reception of the washer, said sockets each having areas of minor and major depth for the reception of the body and rib portions of the associated washer those portions of the disk in alignment with the sockets having a higher compression factor than the remainder of the disk.

3. A flexible coupling comprising opposed spiders, a plurality of flexible disks in face to face relation disposed between the spiders and bolts extending from each spider through the disks of the coupling and having disposed thereon between each pair of adjacent disks a washer, the washers comprising a body portion having at at least one face thereof a projecting rib, said disks having formed therein about openings for the passage of said bolts at at least one face thereof a socket for the reception of the washer, said sockets each having areas of minor and major depth for the reception of the body and rib portions of the associated washer, the areas of major depth having an excess depth over the areas of minor depth slightly less than the depth of the rib portions of the washer whereby said rib portions upon compression being applied to the assemblage exert a clamping action upon the disk prior to the engagement of the body portion of the washer with the disk, those portions of the disk in alignment with the sockets having a compression factor higher than the remainder of the disk.

4. A flexible coupling comprising opposed spiders, a plurality of flexible disks in face to face relation disposed between the spiders and bolts extending from each spider through the disks of the coupling and having disposed thereon between each pair of adjacent disks a washer, the washers comprising a body portion having at at least one face thereof a projecting rib, said disks having formed therein about openings for the passage of said bolts at at least one face thereof a socket for the reception of the washer, said sockets each having areas of minor and major depth for the reception of the body and rib portions of the associated washer, those portions of the disk aligned with the socket in the general direction of the axis of the coupling being compressed beyond the compression of the remainder of the disk to an extent proportionate to the depth of the major and minor portions of the socket.

5. A flexible coupling comprising opposed spiders, a plurality of flexible disks in face to face relation disposed between the spiders and bolts extending from each spider through the disks of the coupling and having disposed thereon between each pair of adjacent disks a washer, the washers comprising a body portion having at at least one face thereof a projecting rib, said disks having formed therein about openings for the passage of said bolts at at least one face thereof a socket for the reception of the washer, said sockets each having areas of minor and major depth for the reception of the body and rib portions of the associated washer, the areas of major depth having an excess depth over the areas of minor depth slightly less than the depth of the rib portions of the washer whereby said rib portions upon compression being applied to the assemblage exert a clamping action upon the disk prior to the engagement of the body portion of the washer with the disk, those portions of the disk aligned with the socket in the general direction of the axis of the coupling being compressed beyond the compression of the remainder of the disk to an extent proportionate to the depth of the major and minor portions of the socket.

JAMES RUSSELL HEMEON.